Oct. 13, 1964   C. F. B. SHATTOCK   3,152,613
VALVE DEVICE HAVING VALVE BORE LINER WITH O-RING SEAL
Filed Sept. 29, 1961
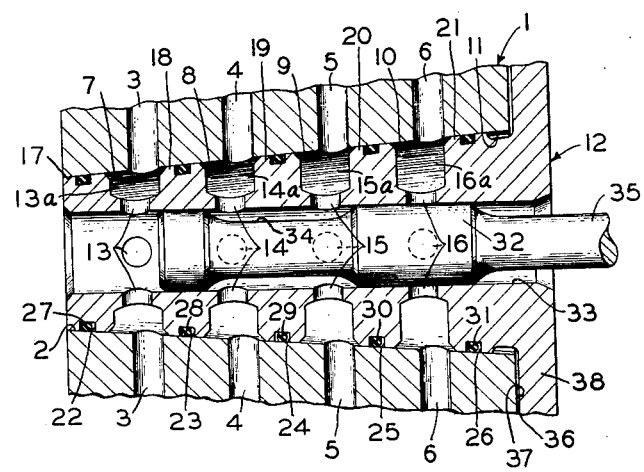
INVENTOR.
CHARLES F. B. SHATTOCK
BY
*A. A. Steinmiller*
ATTORNEY

United States Patent Office 3,152,613
Patented Oct. 13, 1964

3,152,613
VALVE DEVICE HAVING VALVE BORE LINER WITH O-RING SEAL
Charles F. B. Shattock, London, England, assignor to Westinghouse Brake & Signal Company, Ltd., London, England
Filed Sept. 29, 1961, Ser. No. 141,742
Claims priority, application Great Britain Dec. 14, 1960
3 Claims. (Cl. 137—625.48)

This invention relates to fluid pressure valve structure and, more particularly, to a novel structure of valve bushings having a plurality of passageways therethrough, each of said passageways being separated by O-ring seals to prevent intercommunication therebetween.

In fluid pressure systems it is common practice to use multiple passage valves comprising a valve body having a longitudinal bore extending therethrough with a plurality of spaced radial passages entering the bore along the length thereof. The aforesaid bore is usually provided with a cylindrical valve bushing having a plurality of ports adjacent and in alignment with the passages in the valve body, and a valve stem or plunger slidable within a bore in said bushing is suitably grooved to selectively direct the flow of fluid under pressure from one passage in the valve body to another, via the ports in the valve bushing and the grooves or recesses in said plunger. Between each of said passages and communicating ports, suitable sealing means is located, said sealing means being preferably of the O-ring type carried in grooves encircling the valve bushing and seating in corresponding lands in the bore of the valve body to prevent fluid communication along the external circumferential surface of said bushing between the individual ports.

The valve structure described above is costly and difficult to construct due to the necessity of detailed machining operations such as the chamfering of both the leading and trailing edges of the passages of the valve body at their point of entry into the bore, especially where the bore in the valve body is relatively long and of small diameter. This chamfering is required to prevent damage to the O-ring by any sharp edges when the valve bushing is inserted or removed from the valve body.

One suggested improvement over the valve structure just described is to vary the structure of the bushing to that of a stepped bushing whereby the diameter of the bushing where the O-rings encircle same is stepped successively between each of the O-rings toward the end of the bushing and similarly the diameter of the bore in the valve body is stepped to receive said stepped bushing. Thus, the diameter of the bushing and the bore is comparatively small at one end thereof and successively larger in a stepping fashion between each O-ring toward the opposite end of both the bushing and the bore. The stepping structure eliminates the necessity for chamfering the edges of the passageways at their respective openings in the bore, but still requires chamfers to be cut on the stepping corners of the valve body, as the O-rings could be damaged on inserting the bushing in the successively decreasing stepped bore diameters. This valve structure, including the chamfering of the stepped bore edges, involves a costly and difficult machining operation especially because the stepped bore and engaging stepped bushing diameters must be concentric and of correct diameters.

In view of the costly and difficult machining operations for construction of valve structures presently being used, it is an object of the present invention to provide a new and improved valve structure whereby machining thereof is greatly simplified and the cost of such machining is relatively inexpensive.

According to the present invention, there is provided an improved valve structure comprising a valve body having a longitudinal uniformly tapered bore extending therewithin from one end of said body to the other end where the diameter of the bore is comparatively smaller than the diameter of the bore at said one end, said tapered bore receiving therein a valve bushing, the outside longitudinal circumferential surface of which is correspondingly tapered to fit in said bore with a relatively close tolerance between the surface of the bore and the outer surface of the bushing. The valve body contains a plurality of axially spaced radial passages or grooves encircling the inside of the bore with a plurality of tapered lands between said passages or grooves. The bushing has a plurality of radial ports longitudinally spaced and opening into a circular groove aligned with a corresponding passage in the body, with a plurality of tapered lands between each of said ports. A circumferential groove is provided in each land to receive an O-ring seal, the seals being of successively different diameters for each respective land. Also, the O-ring diameter is larger than the small diameter end of the individual tapered land and smaller than the large diameter end of the said individual tapered land such that the O-ring seal will not be damaged by contact with the leading or large diameter end of the said land and will seat on the corresponding land of the bore at a point substantially midway between the ends thereof. In a concentric longitudinal bore, of uniform diameter, in the bushing, there is slidably received a valve plunger, said plunger being slidably positioned within said bore to interconnect adjacent ports in said bushing by means of circumferential recesses therein according to valve requirements.

The accompanying single figure of the drawing is a sectional elevation view of a typical valve structure illustrating the invention.

Description

As shown in the drawing, the valve structure comprises a valve body 1 (the outer shape thereof being of any convenient form not shown) having a longitudinal tapered bore 2 provided with a plurality of spaced encircling grooves or passages 3, 4, 5 and 6 opening into said bore and forming a series of spaced bore lands 7, 8, 9, 10 and 11 between the outer ends of the bore and the end passages 3 and 6 and between each of the passages. In the drawing, the encircling grooves or passages 3, 4, 5 and 6 are shown as diametrically opposing radial ports interconnected externally in a manner not shown nor necessary for an understanding of the present invention.

A bushing 12, having a series of spaced radial ports 13, 14, 15 and 16 opening into respective encircling grooves 13a, 14a, 15a and 16a therein which, in turn, are aligned and establish a communication with respective passages 3, 4, 5 and 6 in the body, is provided with an outer surface of bushing lands 17, 18, 19, 20 and 21 between said respective encircling grooves tapered corresponding to the taper of the bore 2. Each of the bushing lands 17 through 21 has a circumferential groove 22, 23, 24, 25 and 26, respectively, approximately midway between adjacent ports. Sealing O-rings 27, 28, 29, 30 and 31 of successively increasing diameters are inserted in the respective circumferential grooves 22 through 26 to prevent communication between adjacent ports along the surface of the bore lands or bushing lands.

A plunger valve 32 is inserted in a concentric bore 33 within the bushing 12 and is slidably moved along said bore 33 in a manner to utilize a recess 34 therein to selectively establish communication between adjacent ports in the bushing 12 as necessitated by the valve requirements. The plunger valve 32 may be of any type motivated through an external rod portion 35 by either manual or mechanical means, not shown.

In the construction of the valve body, the angle of taper and width of the bore lands 7 through 11 between the grooves or passages 3 through 6 is so arranged that the diameter of each successive bore land at its larger end is greater than the free (not compressed) diameter of the corresponding O-ring when mounted in its respective groove. For example, the largest diameter of the bore land 7 is greater than the free diameter of the O-ring 27. Thus the leading edge of each land is large enough that the O-rings will not engage said edge when the bushing is inserted in the bore and will not, therefore, be damaged.

In order to insure that the compression of each of the O-rings remains adequate when seated in the bore 2, the tapered outer surface of the bushing 12 is permitted to engage in metallic contact with the tapered bore 2 on each of the bore lands 7 through 11, and in order to allow for machining tolerances on the diameters of the tapered surfaces of both the bushing 12 and the body 1, a small clearance 36 is provided between the larger end face 37 of the valve body and a flange 38 on the bushing 12. If the tapers of both the bushing 12 and the body 1 are machined correctly, and the depths of the O-ring grooves are correct, the bushing may be inserted in the bore 12 without damage to the O-rings, and an adequate compression of the O-rings may be obtained by a tight fitting therebetween, said compression being maintained by securing the bushing 12 in the body 1 by any suitable means (not shown) such as bolts between the flange 38 and the valve body 1.

To obtain exact longitudinal positioning of the bushing 12 in the bore 2 it might not be possible to maintain the small clearance 36 between the flange 38 and the valve body face 37. In this case, the flange 38 may engage the face 37 thereby allowing a small clearance between the tapered lands of both the bore and the bush depending upon the tolerances of their diameters.

In the valve structure herein described, the dimensions of the tapered surfaces may be varied, and the dimensions of the O-rings may accordingly be varied to match the corresponding dimensions of said taper as long as it is insured that each bore land between the individual passages therein is sufficiently wide enough to insure that the bore diameter at the larger end is greater than the diameter of the corresponding O-ring when seated in its groove and that the diameter of the O-ring is sufficient to be compressed between the two tapered surfaces. The remainder of the longitudinal pitch between the O-rings may be used for port width.

Although the description of the valve structure afforded herein includes a valve body having four passages, it should be understood that the valve requirements may necessitate more or less than four passages which may be supplied with present structure as desired.

Having now described the invention, what I claim as new and desire to secure by Letters Patent, is:

1. A valve structure comprising a valve body having a longitudinal uniformly tapered bore, a plurality of spaced radial passages entering said bore and forming tapered bore lands therebetween on the inner surface of said bore, and bushing means having a uniformly tapered outer surface conforming with the tapered inner surface of said bore and a longitudinal concentric duct therethrough, said bushing means having a plurality of radial ports therein selectively spaced to be respectively aligned with said spaced passages in said bore when said bushing is seated in the bore to thereby provide a fluid pressure communication between adjacent passages via said ports and said duct, said bushing having on the outer surface thereof a plurality of tapered bushing lands between adjacent ports, each of said bushing lands having a circumferential groove therein, and a sealing ring in each of said circumferential grooves, said tapered bore lands and said tapered bushing lands having a degree of taper of successively different diameters and each of said sealing rings projecting out of the corresponding groove beyond the outer surface of said bushing and being of such diameter in the free condition thereof that it will not contact the leading edge of the corresponding said bore land and will contact the corresponding said bore land only at a point between the trailing edge and the leading edge thereof for causing compression of said sealing rings on each of said bore lands respectively as the bushing is seated in the bore in the valve body.

2. Valve structure as described in claim 1, being further characterized by plunger means having an annular groove therein and being slidably movable in said duct to selectively establish communication between two adjacent ports in said bushing via said annular groove.

3. A valve structure comprising a valve body having a longitudinal uniformly tapered bore, a plurality of axially spaced radial passages entering said bore and having bore lands therebetween on the inner surface of said bore, and bushing means having a uniformly tapered outer surface conforming with the tapered inner surface of said bore and a longitudinal concentric duct therethrough, said bushing means further having a plurality of axially spaced radial ports therein selectively spaced to be respectively aligned with said axially spaced passages entering said bore in the valve body when said bushing is seated in the bore to thereby provide a fluid pressure communication between adjacent passages via said ports and said duct, said bushing having a plurality of tapered bushing lands between adjacent ports on the outer surface thereof, each of said bushing lands having a circumferential groove therein and a sealing ring in each of said circumferential grooves, said sealing rings in free condition thereof projecting out of the respective circumferential grooves beyond the surface of the bushing, the pitch of the taper of said bore lands being such that the larger diameter end of each of said bore lands is of greater diameter than the outer diameter of the sealing ring in its free condition for each corresponding one of said bore lands and the smaller diameter end of each of said bore lands is smaller than the diameter of the said sealing ring in its free condition for each corresponding one of said bore lands with the result that the sealing rings will not contact the leading edge of the corresponding said bore lands and will contact said bore lands only at a point between the trailing edge and the leading edge thereof for causing compression of said sealing rings on each of said bore lands respectively as the bushing is seated in the bore in the valve body.

References Cited in the file of this patent

UNITED STATES PATENTS

| | | |
|---|---|---|
| 2,271,137 | Hamer | Jan. 27, 1942 |
| 2,656,144 | Frantz | Oct. 20, 1953 |
| 2,880,748 | Elsey | Apr. 7, 1959 |
| 2,899,939 | Norris | Aug. 18, 1959 |
| 2,952,275 | Mock | Sept. 13, 1960 |
| 2,989,988 | Rudelick | June 27, 1961 |

FOREIGN PATENTS

| | | |
|---|---|---|
| 1,173,532 | France | Oct. 27, 1958 |